United States Patent [19]
Holwerda

[11] Patent Number: 5,243,153
[45] Date of Patent: Sep. 7, 1993

[54] ACOUSTICAL BARRIER WITH ACOUSTICAL SEAL

[75] Inventor: Matthew J. Holwerda, Hudsonville, Mich.

[73] Assignee: Cascade Engineering, Inc., Grand Rapids, Mich.

[21] Appl. No.: 780,884

[22] Filed: Oct. 23, 1991

[51] Int. Cl.$^5$ .............................. F16F 15/0; F16L 5/00
[52] U.S. Cl. ........................................ 181/208; 248/56
[58] Field of Search ................. 181/208; 248/56, 111; 277/212 C, 212 F; 285/192, 200

[56] References Cited

U.S. PATENT DOCUMENTS

| | | | |
|---|---|---|---|
| 3,162,412 | 12/1964 | McEntire | 248/56 |
| 3,365,761 | 1/1968 | Kalvig | 248/111 |
| 3,881,752 | 5/1975 | Fujishima | 285/46 |
| 4,255,098 | 3/1981 | Hertell | 418/76 |
| 4,488,394 | 12/1984 | del Ser Gonzalez | 53/585 |
| 4,717,385 | 1/1988 | Cameron et al. | 604/174 |
| 4,750,411 | 6/1988 | Eversole | 98/40.05 |
| 4,824,021 | 4/1989 | Binder | 239/284.1 |

Primary Examiner—Michael L. Gellner
Assistant Examiner—Eddie C. Lee
Attorney, Agent, or Firm—Varnum, Riddering, Schmidt & Howlett

[57] ABSTRACT

An acoustical barrier, an aperture and a pipe or cable passing therethrough wherein the aperture has a number of radially extending slits which define a plurality of radial sectors which also extend from the aperture. One or more grooves are arranged in the sectors concentrically about the aperture to increase the radial flexibility of the sectors so that the sectors more closely conform with the shape of the pipe or cable passing through the aperture and thereby reduce the spacing between the slits and reduce the noise passing through the seal.

9 Claims, 2 Drawing Sheets

ACOUSTICAL BARRIER WITH ACOUSTICAL SEAL

FIELD OF THE INVENTION

This invention relates to an acoustical barrier such as a housing, for example, for automotive HVAC units, for solenoid covers, dashboard covers and engine side acoustical barriers, through which pipes and/or flexible cables pass, and, more particularly, to acoustical seals formed in barriers for pipes and cables.

STATE OF THE PRIOR ART

Acoustical barriers are provided in many automotive parts to reduce noise. For example, HVAC units in automobile engines have an acoustical housing to reduce the HVAC noise. Pipes must project through the housing from the HVAC unit to deliver cooling fluid to heat exchangers. The holes in the housing reduce the noise-attenuation capabilities of the housing. Typically, the aperture in the housing is bounded by a plurality of radially extending slits which define a plurality of radial sectors which also extend from the aperture. The housing is typically made of a filled elastomeric material which is fairly stiff. Typically, the sections do not bend significantly, thereby leaving relatively wide openings between the sectors and thereby reducing the noise-attenuation capability of the housing.

SUMMARY OF THE INVENTION

According to the invention, the noise-reducing capability of an acoustical barrier with an aperture and a pipe or cable passing therethrough has been increased significantly by reducing the spacing between radially disposed sectors surrounding an opening. According to the invention, at least one groove in the sectors is arranged concentrically about the aperture to increase the radial flexibility of the sectors so that the sectors more closely conform with the shape of the pipe or cable passing through the aperture and thereby reduce the spacing between the slits and reduce the noise passing through the seal.

Typically, the aperture is somewhat smaller in diameter than the diameter of the pipe or cable passing through the aperture and therefore the sectors are bent out of the plane of the article. The groove can be formed in either side of the sectors. That is to say, the groove can be on the outside or the inside of the article so that the width of the groove either increases or decreases as the sectors are bent. In a preferred embodiment of the invention there are two grooves concentrically arranged around the aperture. In materials with low tear strength, each slit has circular ends to prevent further propagation of the slit.

The invention is applicable to all kinds of acoustical barrier articles, including, but not limited to, HVAC housings for automobiles wherein pipes extend through the housing, transmission solenoid covers wherein cables extend through the cover, dashboard covers wherein cables or pipes extend through the cover and engine side acoustical panels wherein cables or pipes extend through the panels.

BRIEF DESCRIPTION OF THE DRAWINGS

The invention will now be described with reference to the accompanying drawings in which.

DETAILED DESCRIPTION OF THE PREFERRED EMBODIMENT

Figure 1:
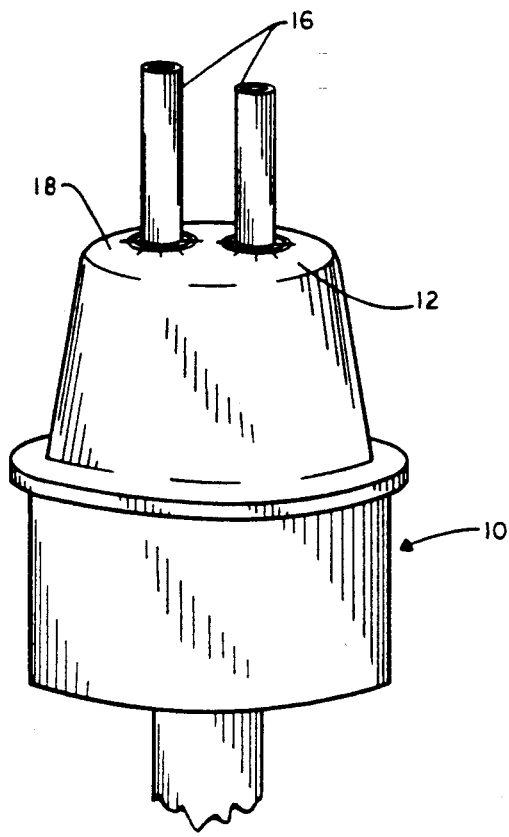
FIG. 1 is a perspective view of a housing having acoustic seals according to the invention.
Figure 2:
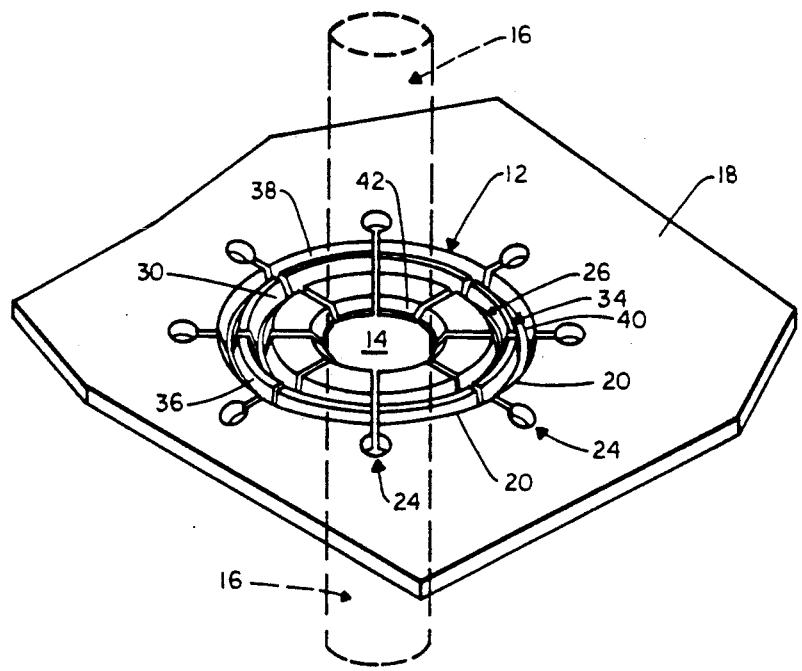
FIG. 2 is an enlarged perspective view of an acoustic seal shown in FIG. 1.

Referring initially to FIGS. 1-2 of the drawings, an acoustical barrier 18, for example, molded to form a housing of a heating, ventilation and air-conditioning (HVAC) unit 10, has a pair of pipes 16 extending therethrough. The pipes are acoustically sealed to the housing through an acoustical seal identified generally at 12. The seal 12 limits sound leakage which would otherwise escape the acoustical barrier 18 through the pipe-receiving apertures in the housing.

In the application shown, the acoustical barrier 18 has a flexible resilient body which can be any suitable elastomeric material measuring approximately ⅛ inch thick. While the barrier 18 can be constructed out of any suitable materials, high-density thermoplastic olefins have proved effective in possessing the necessary qualities of stiffness, environmental resilience and sound absorbency. These compounds are typically filled with a well-known sound-deadening filler material.

The acoustical barrier 18 is provided with one or more pipes or other control element receiving apertures 14, pipes 16 being shown schematically supported within the apertures 14 in FIGS. 1-2. The perimeter of each aperture 14 is formed with tapered edges 42, 44 (FIG. 4) in order to better accommodate objects received in the opening. The diameter of the aperture 14 depends upon numerous factors including the diameter of the object to be received, the stiffness of the acoustical panel, and the tolerance levels relating to pipe position. In order to maximize the sound absorbency capabilities of this device, the aperture 14 should be designed with a diameter which is less than the size of the pipe 16 or other object to be received. Moreover, the aperture 14 should be small enough such that even when situated at its most extreme tolerance, the pipe 16 still abuts the tapered edges 42, 44 completely about its perimeter. Under this requirement, the difference between the diameter of the aperture 14 and the diameter of the pipe 16 has an inverse relationship with the tolerance levels associated with the pipe position. Thus, pipe positions which grossly deviate from the center of the aperture 14 require a smaller opening to ensure that contact is made between the tapered edges 42, 44 and the perimeter of the pipe 16.

A number of slits 22 are radially disposed about the aperture 14, each slit extending outwardly from the perimeter of the aperture 14 a fixed distance into the acoustical barrier 18. The radial slits 22 are provided with circular ends 24, which prevent the slits from tearing under stress. The slits 22 create a series of adjacent circle sectors 20, radially disposed about the aperture 14. When not in use, the circle sectors 20 remain in the plane of the acoustical panel 18 immediately surrounding the aperture 14. However, the flexible nature of the panel enables the circle sectors 20 to bend in and out of the plane when met with a pivotal force, as would occur when the aperture 14 receives a pipe of relatively greater diameter.

Figure 3:
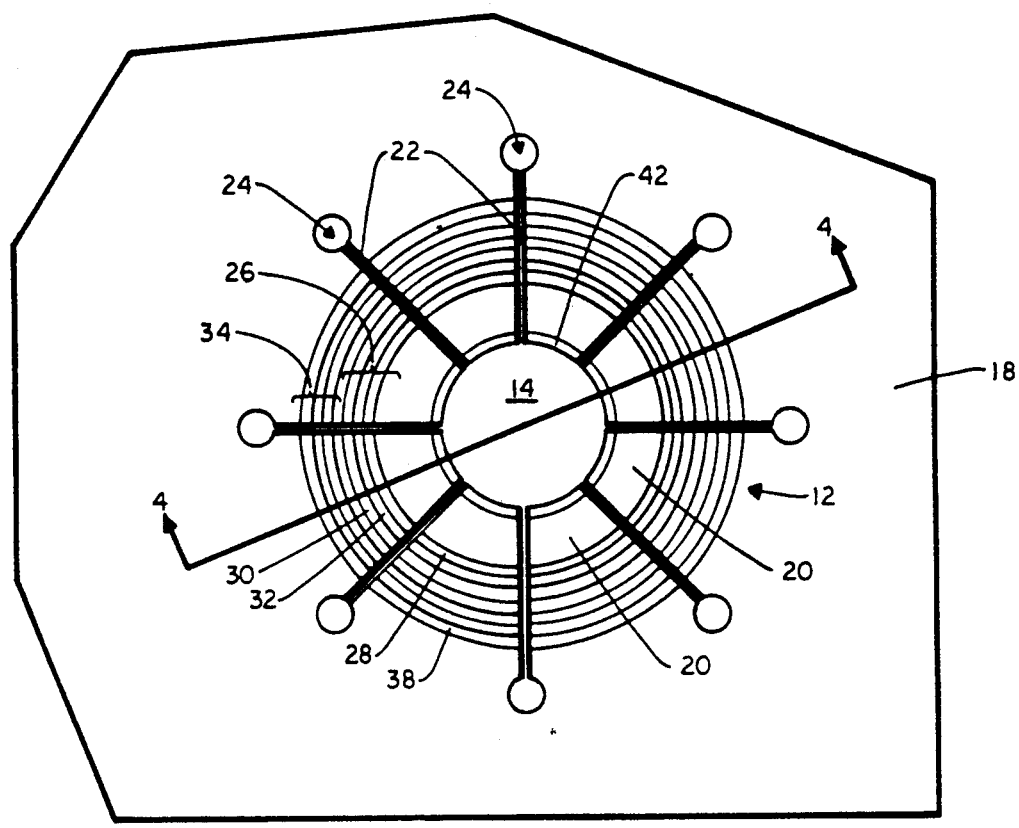
FIG. 3 is a fragmentary and elevational view showing the acoustical seal of FIGS. 1 and 2 without a pipe extending therethrough.
Figure 4:
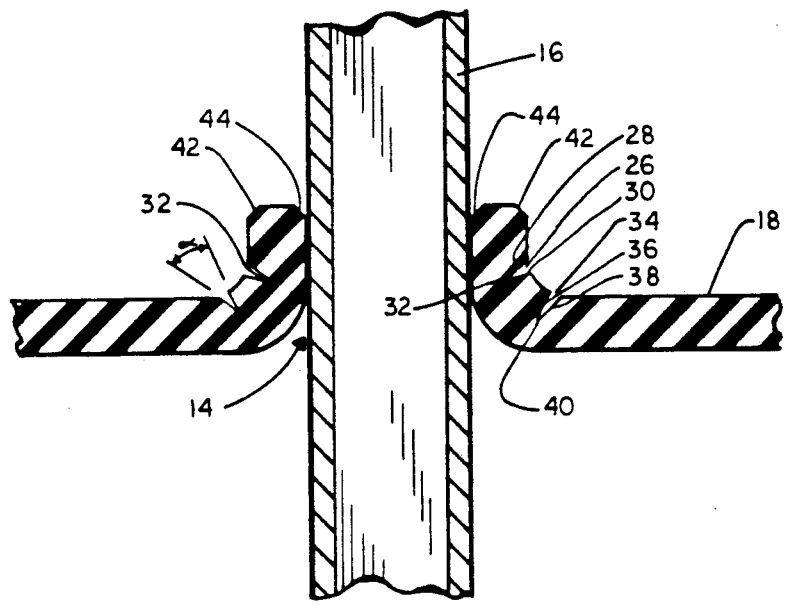
FIG. 4 is a side elevational view in section taken along line 4—4 FIG. 3, and showing a pipe in the aperture.

Referring now to FIGS. 3-4, each circle sector 20 has an inner groove 26 and an outer groove 34, both of which are portions of a circular groove concentrically disposed about the aperture 14. The inner groove 26 comprises an inner walls 28, outer walls 30, and a bottom 32. Likewise, the outer groove 34 comprises an inner wall 36, an outer wall 38 and a bottom 40. The groove inner walls 28, 34 and their companion outer walls 30, 38 are angularly disposed with respect to one another such that they meet at the groove bottoms 32, 40. When not in use, an angle α exists between the inner 28, 36 and outer 30, 38 walls, making a cross-sectional view of the grooves 26, 34 resemble a rounded "V" shape.

The addition of grooves 26, 34 concentrically arranged about the aperture 14 and positioned on each of the circle sectors 20 increases the flexibility of the sectors 20. Since the thickness of the acoustical panel 18 is relatively smaller at the groove bottoms 32, 40, the pivotable capabilities of the sectors are enhanced around the grooves 26, 34. Thus, an upward force exerted on the sectors 20 causes the grooves' inner walls 28, 36 and outer walls 30, 38 to "close-in" on one another, thereby decreasing the angle α between them. Similarly, a downward force spreads apart the grooves 26, 34, increasing the angle α. In this manner, the angle α "absorbs" the pivotal forces exerted on the sectors 20.

Referring again to the drawings, when the aperture 14 receives a pipe 16 of relatively greater diameter, a resulting upward force is exerted upon the sectors 20, displacing them outside the plane created by the surrounding acoustical panel 18. Since the grooves 26, 34 give the sectors 20 greater flexibility, however, the resulting displacement is significantly reduced over earlier designs. This reduction in displacement minimizes the gaps created by the radial slits 22, resulting in an improved seal.

Although the embodiment shown in the drawings represents the preferred embodiment of the invention, it is contemplated that a pipe 16 could be inserted down into the HVAC unit 10, thereby displacing the radial sectors 20 in the opposite (inward) direction. Because of the oppositely directed force, the angle α between the grooves' inside 28, 36 and outside 30, 38 walls would increase, although the practical effect would remain the same.

Although the invention has been described with concentric grooves 26, 34 on the outside of the housing, the concentric grooves 26, 34 can be located on the inside of the housing. Such a configuration, however, would not significantly change the performance of the invention.

It is contemplated that the invention can be used for a variety of other applications, including both automotive and non-automotive uses. Such uses can include, but are not limited to, transmission solenoid covers, dashboard covers and engine side acoustical barriers. Each of these applications possess the common need for an effective acoustical barrier which can receive various types of pipe and flexible cable.

If the application of the invention requires a more dense, less flexible or thicker acoustical panel, additional concentric grooves may be necessary to ensure a more effective seal. In other cases, only one concentric groove will be used. Additional factors such as noise absorbency requirements, pipe positional tolerance, cable flexibility, pipe diameter, and acoustical panel characteristics will affect the number and design of concentric rings.

Reasonable variation and modification are possible within the scope of the foregoing disclosure and drawings without departing from the spirit of the invention which is defined by the accompanying claims.

I claim:

1. An acoustical barrier formed of a resilient material and having a pipe or cable passing therethrough and a seal in the article for the pipe or cable;

the seal having an aperture and a plurality of radially disposed slits extending from the aperture to define a plurality of sectors which also extend from the aperture;

the improvement in the seal comprising:

at least one groove in the sectors arranged concentrically about the aperture to increase the radial flexibility of the sectors so that the sectors more closely conform with the shape of the pipe or cable passing through the aperture and to reduce the spacing between the slits, thereby reducing the noise passing through the seal;

the at least one groove having a rounded V-shaped when said sectors are undeformed.

2. An acoustical barrier according to claim 1 wherein the groove is formed on a side of the article, panel or barrier and the sectors are bent outwardly of the side so that the width of the groove decreases as the sectors are bent outwardly of the side.

3. An acoustical barrier according to claim 1 wherein the groove is formed on a side of the housing, panel or barrier and the sectors are being inwardly of the side so that the width of the groove increases as the sectors are bent inwardly of the side.

4. An acoustical barrier according to claim 1 wherein there are two grooves concentrically arranged around the aperture on the same side of the barrier.

5. An acoustical barrier according to claim 1 wherein each slit has circular ends.

6. An acoustical barrier according to claim 1 wherein the barrier is an HVAC housing for an automobile and at least one pipe extends through the housing.

7. An acoustical barrier according to claim 1 wherein the barrier is a transmission solenoid cover and a cable extends through the cover.

8. An acoustical barrier according to claim 1 wherein the barrier is a dashboard cover and a cable extends through the cover.

9. An acoustical barrier according to claim 1 wherein the barrier is an engine side acoustical panel and a cable extends through the panel.

* * * * *